March 14, 1961     J. D. DORSEY ET AL     2,974,696

COMBINATION WOODWORKING MACHINE

Filed April 8, 1959     2 Sheets-Sheet 1

INVENTORS
JOHN D. DORSEY
and RONALD D. NICHOLAS
BY Charles Richard Werner
ATTORNEY March 14, 1961  J. D. DORSEY ET AL  2,974,696
COMBINATION WOODWORKING MACHINE
Filed April 8, 1959  2 Sheets-Sheet 2
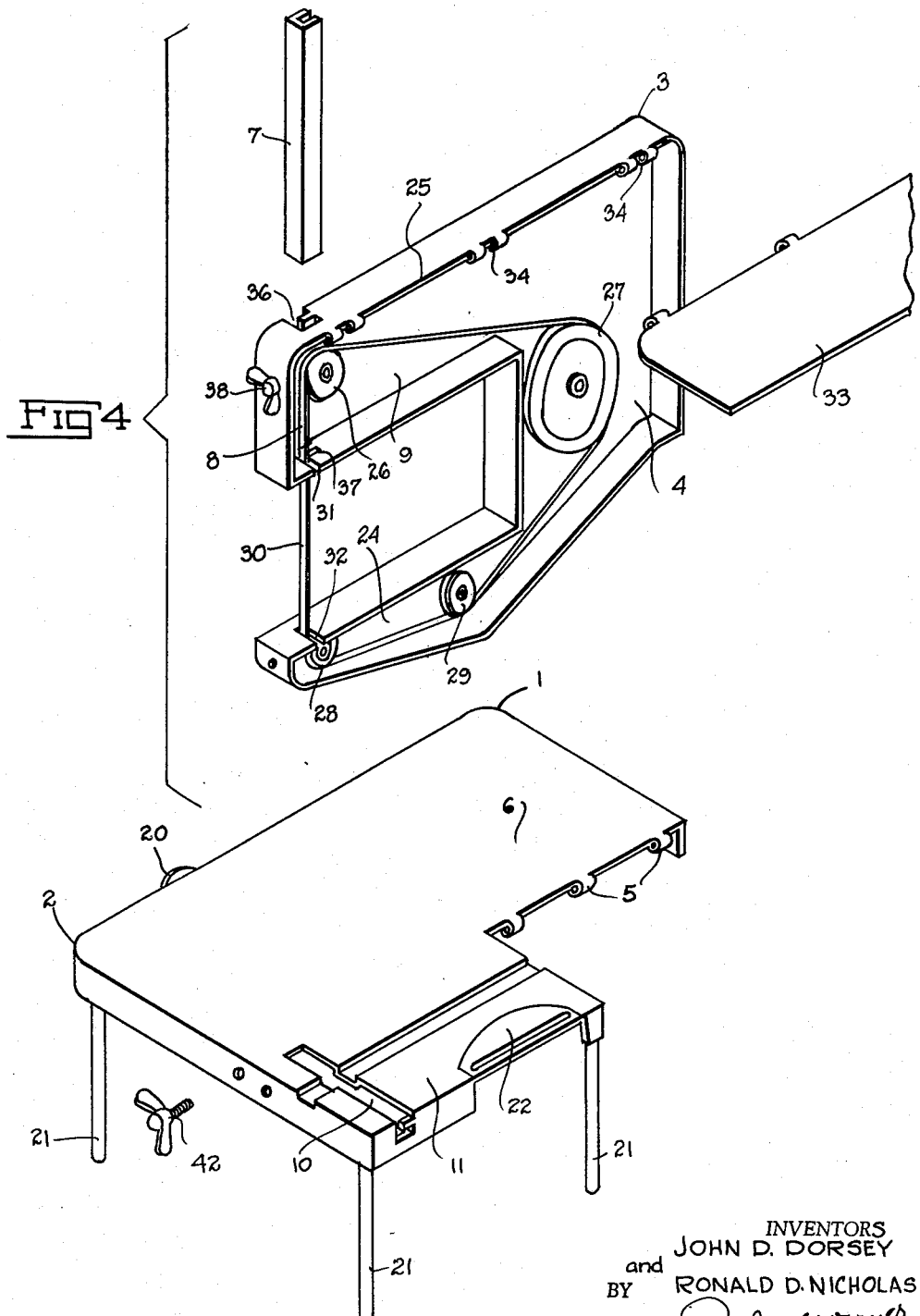
INVENTORS
JOHN D. DORSEY
and
BY  RONALD D. NICHOLAS
Charles Richard Werner
ATTORNEY

United States Patent Office 2,974,696
Patented Mar. 14, 1961

2,974,696

COMBINATION WOODWORKING MACHINE

John D. Dorsey, 1751 N. Fountain, Wichita, Kans., and Ronald D. Nicholas, 857 Calle Romano, Tucson, Ariz.

Filed Apr. 8, 1959, Ser. No. 805,006

9 Claims. (Cl. 144—1)

This invention relates in general to combination woodworking machines and in particular to a portable combination table saw and bandsaw, changeable with ease and rapidity from one function to the other.

Our invention is extremely useful not only for the professional craftsman but for do-it-yourselfers, whose facilities are limited as to space, to have a combination and portable device which can perform more than one function.

It is therefore one object of our invention to provide a combination woodworking machine having complete facilities for use as a table saw and at the same time including all the elements necessary for use as a bandsaw, as well as for a disc sander, router, shaper, etc.

It is one more object of our invention to provide a locking member between the two portions of the saw table, said locking member, when the device is in position for use as a bandsaw, forming a guide for the bandsaw blade.

And still another object of our invention is to provide a driving means for the table saw and the band saw in which the table saw drive is easily disconnected, and connection is made to the band saw drive for actuating the latter.

One other object of our invention is to provide a split table top with two L-shaped portions, one portion containing band saw mechanism and being so hinged to the other portion that, upon movement of said band saw portion to a vertical and operating position, a relatively large table portion remains on the other L-shaped portion.

And one further object of our invention is to provide a compact combination woodworking machine for use as a table saw and a band saw, having foldable legs so that the entire device is easily portable.

Other objects and advantages, as well as the construction and operation of our invention will be apparent by reference to the following description in connection with the accompanying drawings in which:

Fig. 4 is a disassociated isometric view of various parts of the invention, with a portion of the table in band saw position, the band saw housing cover being shown in fragmentary view.

Figure 1:
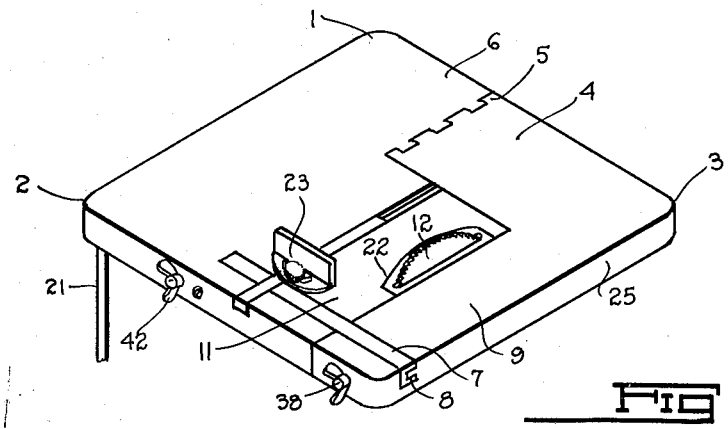
Fig. 1 is an isometric view of the combination woodworking machine in circular saw position, looking downwardly toward the top of the device.
Figure 2:
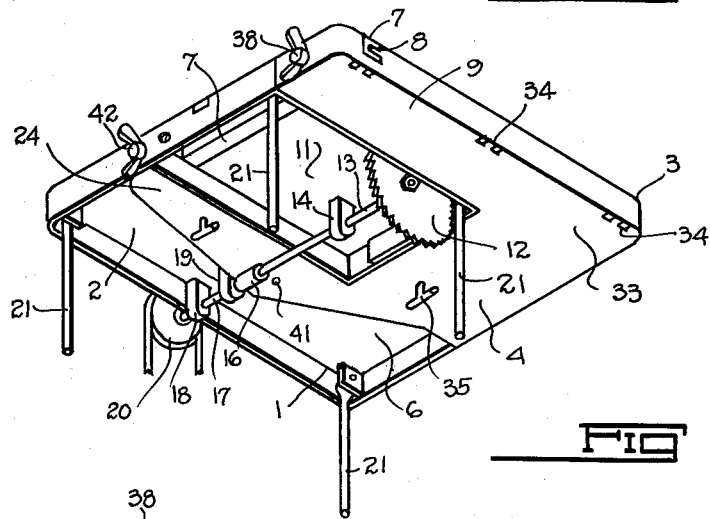
Fig. 2 is an isometric view of the same looking at the underside of the woodworking machine with the circular saw in operating position.
Figure 3:
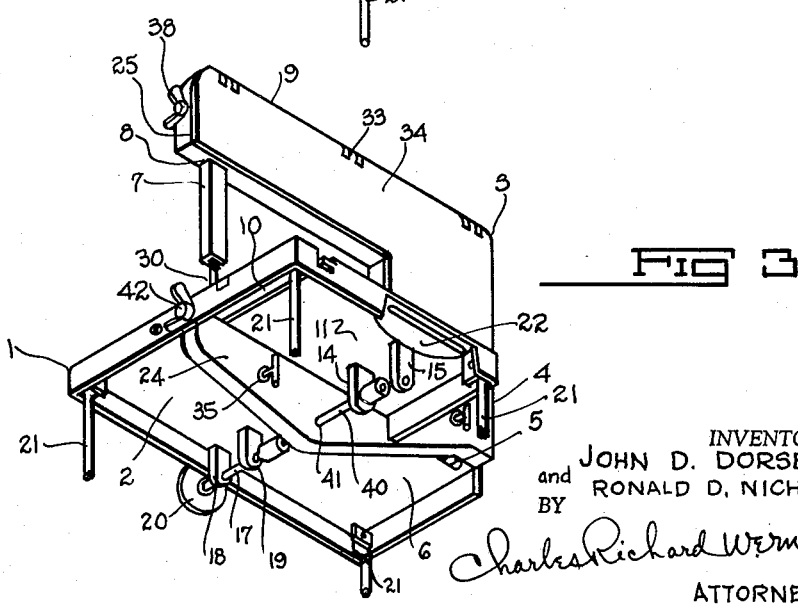
Fig. 3 is a view of the combination woodworking machine showing a portion of the table moved to band saw operating position, also looking upwardly at the underside of the saw table.

Referring now to the drawings by numerals of reference, 1 designates a worktable comprising two L-shaped table portions 2 and 3, leg 4 of table portion 3 being hinged at 5 to leg portion 6 of table portion 2.

When in table saw work table position the two L-shaped table portions 2 and 3 are locked together by means of locking bar 7 keyed in slot 8 of leg 9 of table portion 3 and aligning slot 10 in leg 11 of table portion 2.

The rotatable saw blade 12 is suitably secured to drive shaft 13, journalled at 14 and 15 to the underside of table portion 2 and connected through a coupling member 16 to an extension shaft 17 journalled at 18 and 19 and terminating in a pulley 20 which may be suitably driven in any conventional manner by an electric motor.

Folding legs 21 may be provided to raise the worktable 1 above a bench or other work surface. A table insert 22 is provided as in conventional table saws, as well as a miter gage 23.

When the portable saw is to be used as a bandsaw the locking bar 7 is removed; the table saw blade 12 and shaft 13 are removed at the coupling member 16 and the table portion 3 is swung to a vertical position.

Leg 4 of the table portion 3 has an extension 24 normally concealed under the table portion 2 and the table portion 3 comprises a housing with peripheral edge 25, said housing carrying wheels 26, 27, and two wheels 28 and 29 in the extension 24 guiding the band saw blade 30. Slots 31 and 32 permit entry of the blade 30 onto the wheels.

A suitable cover 33 is hinged to the table portion 3 at 34 and locking means 35 are provided to hold the cover securely in closed position.

Slotted keyways 36 and 37 are provided in the peripheral edge 25 of table portion 3 for reception of the locking bar 7, said slide bar acting as a blade protector and guide when the device is used as a bandsaw. Thumbscrew 38 may be used to adjust the height of the locking bar and guide 7 as well as to lock said bar when it is in table locking position.

When the portable saw is to be used as a band saw and table portion 3 is in a vertical position, the locking bar 7 is reinserted in keyways 36 and 37 and slot 8 and adjusted and locked to the desired height. A stub shaft 40 is inserted in opening 41 in cover 33 and through wheel 29 and connected to the end of shaft 17 in any suitable manner. The extension 24 may be supported in a vertical position by means of lock bolt 42 passing through the peripheral edge of table portion 2, and into the extension 24.

In place of saw blade 12, a disc sander, or router or shaper blades, or dado blades, and the like, can be substituted in a well known manner, illustration and description of such auxiliary devices not being deemed necessary since no invention lies in their adaptation and use with our invention.

It will be seen from the foregoing that the conversion from one to the other position is extremely simple and rapid; that the device is quite portable in nature; that various functions can be performed by the device merely by substituting a disc sander or router or dado blades for the saw blade.

Obviously changes in form, proportion and details of construction may be resorted to without departing from the spirit of our invention and we reserve the right to such changes as come within the scope of these specifications and the claims which follow.

What we claim as new and desire to secure by Letters Patent is:

1. A combination woodworking machine comprising a worktable, said worktable including a plurality of hinged sections normally in coplanar relation for use during certain operations, one of said hinged sections being movable to a vertical position in respect to the worktable for use as a vertical band saw frame and a band saw blade carried by the last mentioned hinged section.

2. A combination woodworking machine comprising a worktable, said worktable including a plurality of hinged sections normally in coplanar relation for use during certain operations, a band saw blade operably mounted in one of said hinged sections, said last-named hinged section with said band saw blade being movable to and operative in a vertical position in respect to the worktable for use as a vertical band saw frame.

3. The structure as specified in claim 1, and a locking member for holding the hinged sections in said normally coplanar relation.

4. The structure as specified in claim 1, and a locking member for holding the hinged sections in said normally coplanar relation, receiving means on the last-named hinged section for said locking bar when removed from hinged section locking position, said receiving means supporting said locking bar in band saw blade guiding position when said last named hinged section is in vertical position.

5. A combination woodworking machine comprising a worktable, said worktable including a plurality of hinged sections normally in coplanar relation for use during certain operations, aligning keyways in the hinged sections, a locking member receivable in the aligning keyways locking the hinged sections in said normally coplanar relation, one of said hinged sections being movable, when unlocked, to a vertical position in respect to the other section of the work table for use as a vertical band saw frame and a band saw blade carried by the last mentioned hinged section.

6. The structure as specified in claim 5, said locking member being receivable by the keyway in the last-named hinged section and providing a band saw guiding means when said last-named hinged section is in vertical position.

7. The structure as specified in claim 5, said locking member being receivable by the keyway in the last-named hinged section after said last-named hinged section has been moved to band saw position, and providing a band saw guiding means.

8. A combination woodworking machine comprising a worktable, said worktable including a pair of L-shaped sections normally in coplanar relation for use during certain operations, a leg of one L-shaped section being in hinged relation to a leg of the other L-shaped section, aligning keyways in the other legs of the L-shaped sections, a locking member being removably received by the aligning keyways to lock the hinged sections in said normally coplanar relation, one of said hinged sections being movable, when unlocked, to a vertical position in respect to the other section of the worktable for use as a vertical band saw frame, and a band saw blade carried by the first mentioned L-shaped section.

9. The structure as specified in claim 8, the first-mentioned hinged leg of the L-shaped sections having an extension disposed below the other leg of the second L-shaped section, the band saw blade being carried by the legs and extension of the first-mentioned L-shaped section, said locking member being receivable in the keyway in the first-mentioned L-shaped section and serving as a band saw guide when said first-mentioned hinged leg is in vertical position.

References Cited in the file of this patent
UNITED STATES PATENTS

| | | |
|---|---|---|
| 1,336,799 | Vaughan | Apr. 13, 1920 |
| 1,617,211 | Hutchinson | Feb. 8, 1927 |
| 1,812,863 | Combs et al. | July 7, 1931 |
| 2,892,476 | Lapsley | June 30, 1959 |